United States Patent [19]

Mandel

[11] 4,174,517

[45] Nov. 13, 1979

[54] CENTRAL SYSTEM FOR CONTROLLING REMOTE DEVICES OVER POWER LINES

[76] Inventor: Jerome Mandel, 15601 Whiteoak La., Huntington Beach, Calif. 92647

[21] Appl. No.: 816,015

[22] Filed: Jul. 15, 1977

[51] Int. Cl.² .................. H04B 3/54; H04M 11/00
[52] U.S. Cl. ........................ 340/310 A; 179/1 SB; 179/2 A; 307/140; 340/310 CP
[58] Field of Search ........ 340/310 R, 310 A, 310 CP, 340/216, 408, 147 R, 309.1, 505, 538; 179/2 A, 2 TC, 2 AM, 1 SB; 307/140, 38, 40, 41; 236/46 R, 46 C; 364/104, 493, 492

[56] References Cited

U.S. PATENT DOCUMENTS

| | | | |
|---|---|---|---|
| 3,440,434 | 4/1969 | Yates et al. | 307/41 |
| 3,558,902 | 1/1971 | Casey | 340/310 CP |
| 3,723,753 | 3/1973 | Davis | 307/41 |
| 3,729,710 | 4/1973 | Sherwin | 340/310 A |
| 3,803,491 | 4/1974 | Osborn | 340/310 R |
| 3,919,479 | 11/1975 | Moon et al. | 179/1 SB |
| 3,971,028 | 7/1976 | Funk | 340/310 A |
| 3,972,471 | 8/1976 | Ziegler | 340/310 A |
| 4,007,458 | 2/1977 | Hollabaugh | 340/310 R |
| 4,021,615 | 3/1977 | James et al. | 179/2 A |
| 4,058,678 | 11/1977 | Dunn et al. | 340/310 CP |
| 4,071,745 | 1/1978 | Hall | 236/46 R |

Primary Examiner—John W. Caldwell, Sr.
Assistant Examiner—James J. Groody
Attorney, Agent, or Firm—Philip M. Hinderstein

[57] ABSTRACT

A system for use in a facility, such as the home, equipped with a common power distribution system, for controlling, from a central location, the operation of a plurality of remote devices. The system includes a central control unit including a memory for storing user-entered command information, preset instructions, time-of-day information, and remote-device selection information. The time-of-day information is compared with the current time-of-day and, in the presence of a time match, the command information and the remote-device selection information is modulated in a serial binary format onto a carrier signal which is coupled directly to the electrical system. A receiver/demodulator unit coupled to the electrical system and to a remote device receives the information from the central control unit and, if the command information is intended for the remote device with which the receiver/demodulator unit is associated, acts on such command information for controlling the operation of the remote device. The system also includes a receiver/demodulator/transmitter unit coupled to the power distribution system and to a remote device including a sensor for receiving and demodulating interrogation signals from the central control unit, for transmitting to the central control unit a signal indicative of the status of the remote device, and for receiving and demodulating command signals for controlling the operation of the remote device; a portable control unit for transmitting command information to the central control unit; and a unit for converting speech to a signal modulated with command information for transmission to the central control unit.

9 Claims, 7 Drawing Figures

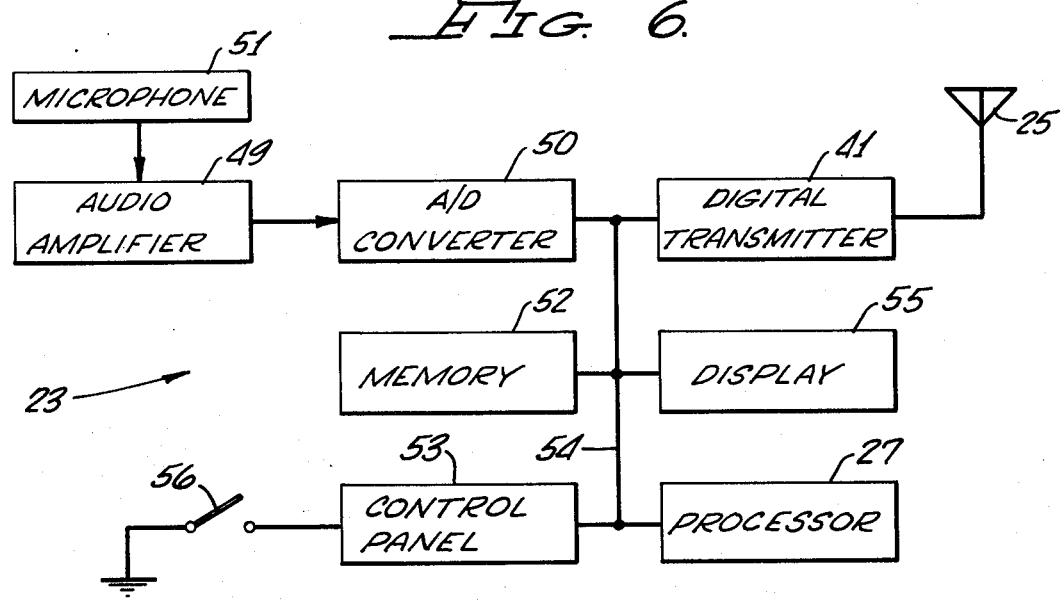
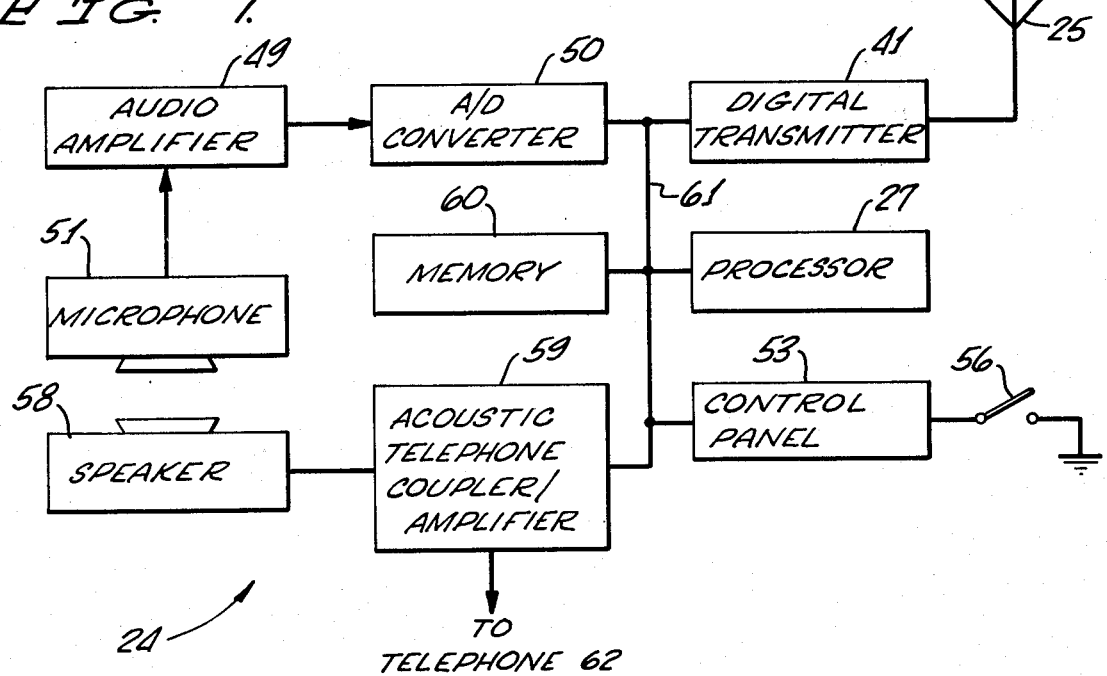

CENTRAL SYSTEM FOR CONTROLLING REMOTE DEVICES OVER POWER LINES

BACKGROUND OF THE INVENTION

1. Field of the Invention

The present invention relates to a central control system and, more particularly, to a system for use in a facility equipped with a common power distribution system for controlling, from a central location, the operation of one or more remote devices.

2. Description of the Prior Art

Many individuals desire to control, usually in the home, various electrical/electronic and electrically actuated devices either from a central location or automatically. The home is an ideal area for either one or both of these control functions since virtually every electrical outlet has an electric/electrical light or electrical appliance or other electrical device connected thereto over which the user must exercise some degree of control.

A prime application for a central control unit is in a house with an invalid or bedridden person or some other individual who cannot constantly or easily move from room to room to manually perform the required control functions. Another application is in the case where there is not normally anyone at home during the day to perform certain functions which require only the operation of switches or the one time setting of controls. Common examples are the turning on or off of lawn sprinklers, the setting of controls on cooking devices to prepare meals, and the turning on and off of lights. Furthermore, many individuals who are away from their homes for long periods, such as on vacations or business trips, like to have a normal pattern of operation of lights and radios to preserve the appearance of being home, thereby discouraging intruders.

Unfortunately, homes are not normally provided with any provision for controlling electrical devices other than manually operated wall switches and virtually all electrical devices are operated by a single, manual, on/off switch. Many devices that are provided with built-in timers will operate only once and require manual resetting for each operation. Devices which do have repetitive timers may require some form of disassembly or may be located so as to be somewhat inconvenient to modify the timing cycle or to allow for manual operation. This is also the case with general purpose timers used only for turning on and off a user selected electrical device. Devices which allow for a remote on/off capability typically require the installation of wires around or across the area in which it is to be used. Devices which have the capability of being remotely controlled in a wireless manner, such as a television set, are only single item users, i.e. the remote control unit controls only the television set. In addition, while not necessarily undesirable in the case of television sets, remote control units of this type are manually operated with no provision for automatic or repetitive control.

Heretofore, the provision of a central control system for controlling the operation of these various types of devices has presented technical problems as to the details of how to control each one of the different types of devices and, as a result, such central control units have been unavailable heretofore. Moreover, since many of the controlled devices will require special wiring, an undesirable expense would be incurred in installation. Even further expense and technical difficulties would be encountered if a central control unit were desired in more than one location.

SUMMARY OF THE INVENTION

According to the present invention, these problems are solved in a manner unknown heretofore. With the present central control system, a user is provided with a central control unit for controlling, from a central location, the operation of one or more remote devices located in a facility, such as the home, equipped with a common power distribution system. The central control unit contains a processor, a memory which stores command information, a control panel for the user to manually enter command information, a digital modulator which impresses a stream of digital signals on the power distribution system, and a digital demodulator which detects and demodulates digital signals from the power distribution system and makes this information available to the processor. The modulator and demodulator operate in frequency ranges well above that of the power distribution system, but well within the capabilities of the wires acting as the power distribution medium. Additionally, the central control unit includes a receiver, operating in a frequency range low enough to receive signals which can be transmitted through the walls, between rooms, for receiving a transmitted signal upon which is impressed a stream of digital signals and a demodulator which makes this received digital stream available to the processor.

Connected to any power distribution system outlet selected by the user are any number of remote receiver/demodulator units, each of which includes a processor, a memory, and a digital demodulator similar to those of the central control unit. Additionally, there are station identifiers to allow each of the processors to be assigned a unique identity and also a relay. The processor may, by comparing the information passed on by the digital demodulator with the setting of the station identifier, determine if the information was intended for this station rather than some other. If the processor determines that the information was indeed intended for this station, then it continues to receive and decode the information and either activates or de-activates a relay connected to control the operation of an adjacent remote device.

Also connected to any of the power distribution system outlets are any number of remote receiver/demodulator/transmitter units which are also connected to a remote device including a sensor, these units being different from the receiver/demodulator units only in having a digital modulator similar to the one in the central control unit, a sensor, and a different set of instructions contained in the memory. The sensor senses some external condition such as temperature, moisture, light, or the like. The processor senses this condition and, either automatically or at the request of the central control unit, activates the digital modulator which transmits a stream of digital signals to the central control unit via the power distribution system. The signals are decoded by the central control unit which, according to the instructions contained in its memory, will then take an action such as transmitting control signals back to either the original receiver/demodulator/transmitter unit or to any other remote unit capable of receiving these signals.

In those instances where continuous portability of a control unit is desired, there is provided a hand held, battery operated control unit which contains a processor, a memory, a manual control panel, a battery, an on/off switch, and a digital transmitter. The user, upon activation of the on/off switch, may then operate the manual control panel whereupon the processor, acting in accordance with instructions contained in the memory, activates the digital transmitter which transmits digital signals back to the central control unit. The central control unit receives these signals, demodulates them, and makes them available to its processor which treats them identically to inputs from the control panel of the central control unit.

For instances where even a portable control unit is impractical, the present invention includes a voice controlled unit. This unit contains a microphone, an audio amplifier, an analog-to-digital converter, a control panel, and a processor, memory, and digital transmitter similar to those previously discussed. The control panel allows the setting of a calibration mode wherein the user speaks selected sounds or words into a microphone. The sounds are amplified and fed to the analog-to-digital converter which converts these sounds to a digital pattern which is stored in the memory. The user is capable of identifying to the processor, which stores in its memory, a control signal unique to each of these sounds. During the operational mode, audio signals are converted to a digital pattern which is compared to those stored in the memory. If there is a match between the received pattern and one of those previously stored, then the processor retrieves from memory the control signal previously defined, activates the digital transmitter in a manner identical to that of the portable control unit, and transmits the stored control signal. The central control unit receives this signal and proceeds in a manner identical to that when a signal is received from a portable control unit.

At times it will be desirable to exercise some control from locations where only telephone communication to the central control unit is practical. Where a voice controlled unit is installed, all that is required is a telephone answering device with an accoustic coupler/amplifier which answers the telephone and couples the received sounds, amplifies them and powers a speaker. The sounds from the speaker are then heard by the voice controlled unit which acts in a manner identical to that previously described.

With the present system, almost any number and combination of the above-described devices may be used to fill each user's unique needs to control electrical/electronic devices or applicances, limited in a technical sense only by the capabilities of the processor and the amount of memory provided with each unit and limited in an economic sense only by the number of units which the user can afford to buy.

OBJECTS

It is therefore an object of the present invention to provide a central control system.

It is a further object of the present invention to provide a system for use in a facility equipped with a common power distribution system for controlling, from a central location, the operation of one or more remote devices.

It is a still further object of the present invention to provide a central control system for the home to control the operation of various electrical or electronic devices or appliances.

It is another object of the present invention to provide a system for communicating control signals from one point in a home to another point in the home where the signals are to be utilized.

It is still another object of the present invention to provide a central control system for the home which utilizes the home's power distribution wiring and receptacles.

Another object of the present invention is the provision of a central control system for the home which eliminates the necessity for re-wiring the home.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 6 is a block diagram of the voice converter/transmitter of the system of FIG. 1; and FIG. 7 is a block diagram of the accoustic telephone converter/transmitter of the system of FIG. 1.

DESCRIPTION OF THE PREFERRED EMBODIMENT

Figure 1:
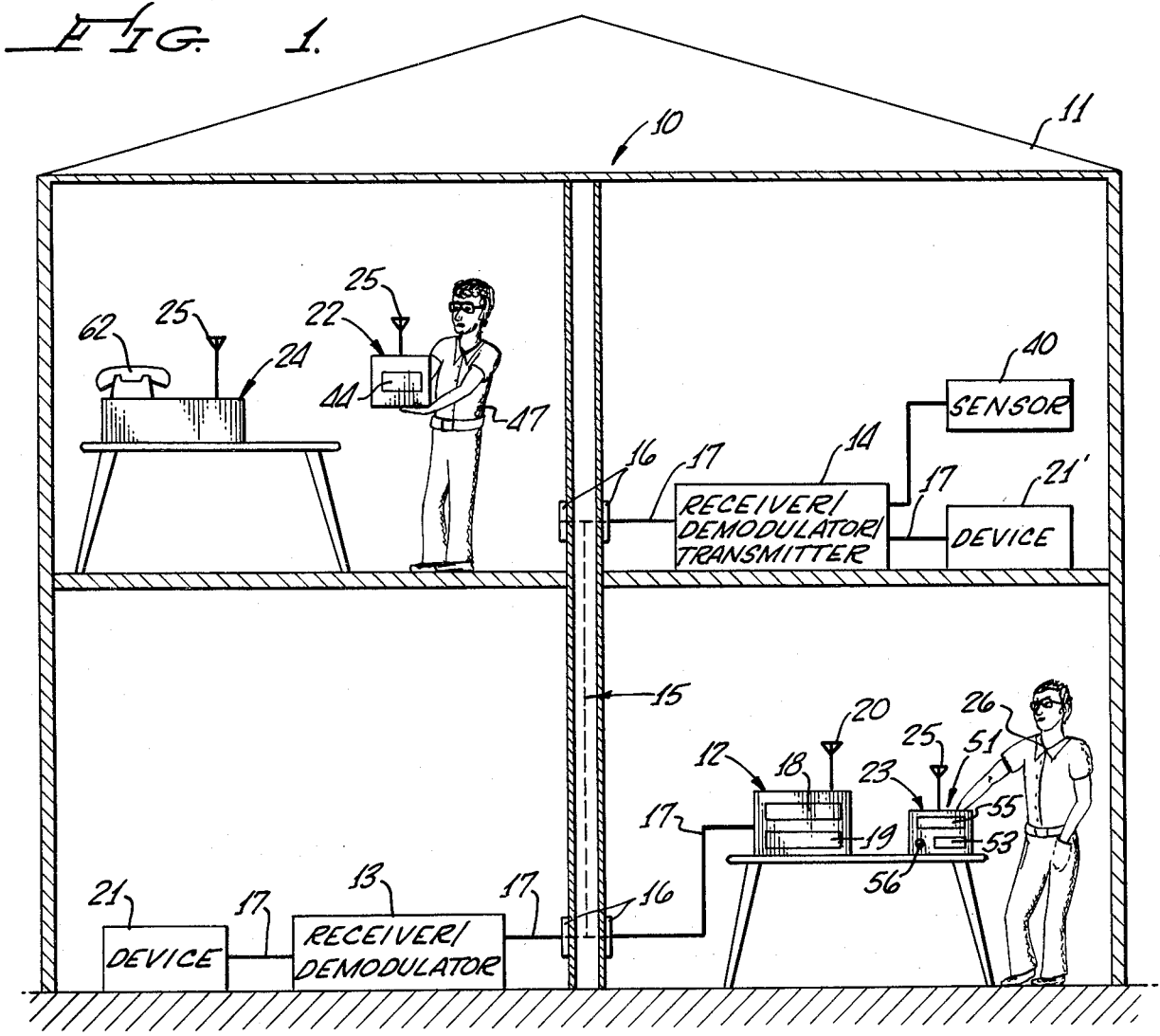
FIG. 1 is a block diagram of the present central control system.

Referring now to the drawings and, more particularly, to FIG. 1 thereof, there is shown a central control system, generally designated 10, for use in a home or other facility 11, for controlling, from one or more central locations, by means of one or more central control units 12, the operation of one or more remote devices 21 and 21'. The only requirement is that home 11 be equipped with a conventional home power distribution system, either the two wire ungrounded or three wire grounded type, generally designated 15. Power distribution 15 includes a plurality of wall taps 16 scattered throughout home 11. Practically every residential location meets these requirements. At different rooms within home 11, there may be connected to wall taps 16 one or more receiver/demodulator units, generally designated 13, or receiver/demodulator/transmitter units, generally designed 14.

Broadly speaking, each central control unit 12, each receiver/demodulator unit 13, and each receiver/demodulator/transmitter unit 14 is connected to power distribution system 15 by means of a standard two or three wire AC power cord 17 plugged into a wall tap 16 or by means of a two or three lead plug embedded into the body of the particular unit.

As will be described more fully hereinafter, central control unit 12 includes a display 18 to indicate time and user entries, a control panel 19 to manually enter user commands, and an antenna 20 to receive transmitted command information. Central control unit 12 receives, via antenna 20, a signal having a first frequency, which signal is modulated with digital command information. All units transmitting command information use the same first frequency. Central control unit 12 converts either this received command information or command information entered via control panel 19 to a digital modulation of a second frequency signal, which signal is coupled directly to power distribution system 15 through power cord 17. All units coupled directly to power distribution system 15 either receive from or transmit through system 15 signals having the same second frequency.

Any number of remote receiver/demodulator units 13 may be coupled directly to power distribution system 15 at any wall tap 16. Units 13 receive signals having the second frequency, demodulate the signal to derive command information, and interpret this information to control the electrical device 21 connected thereto.

Any number of remote receiver/demodulator/transmitter units 14 may also be coupled directly to power distribution system 15 at any wall tap 16. Units 14 perform the same functions as units 13 and for this purpose are connected to an electrical device 21'. Additionally, units 14 convert information from sensors 40 to a modulation of a signal having the second frequency and couple this signal back into power distribution system 15 via wall tap 16.

Signals having the first frequency may be transmitted to central control unit 12 by means of any one or more of a number of devices, such as a portable control unit 22, a voice converter/transmitter unit 23, or an accoustic telephone converter/transmitter unit 24. Portable control unit 22 transmits, via an antenna 25, a first frequency signal modulated with digital command information entered by user 47 via a manual control panel 44. Voice converter/transmitter unit 23 converts verbal commands issued by a user 26 into a first frequency signal modulated with digital command information and transmits this signal via antenna 25 to central control unit 12. Finally, accoustic telephone converter/transmitter unit 24 acts identically to voice converter/transmitter unit 23 with the exception that a telephone answering device with an accoustic coupler is attached to a telephone 62 as will be described more fully hereinafter.

Figure 2:
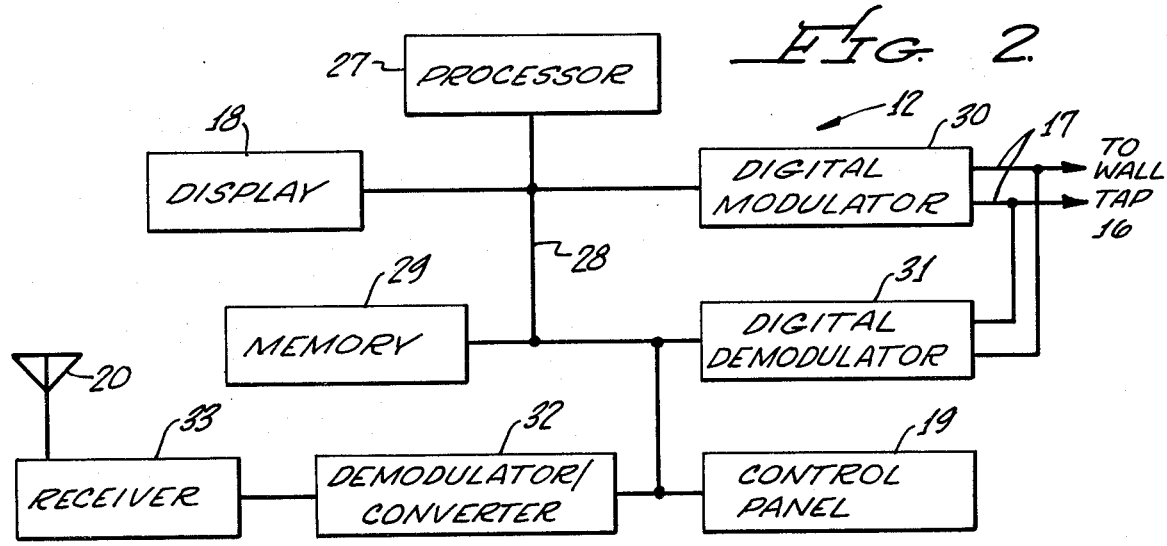
FIG. 2 is a block diagram of the central control unit of the system of FIG. 1.

Referring now to FIG. 2, central control unit 12 includes a processor 27 connected by means of control/data lines 28 to a memory 29, a display 18, a digital modulator 30, a digital demodulator 31, and a demodulator/converter 32. It is over control/data lines 28 that all digital information travels at the direction of processor 27.

Display 18 may be any or a combination of light emitting or reflecting sources such as light emitting diodes or liquid crystal displays similar to those used in digital watches, arranged so as to show time and other items or events controlled by processor 27. Processor 27 may be any of the available micro-processor integrated circuits which function in a manner similar to the central processing units of large, commercially available computers. Typical of these are the 8080 made by Intel, Texas Instruments, National Semiconductor and others, or the F-8 made by Fairchild and Mostek.

Memory 29, as well as the other memories to be described hereinafter, actually consists of two types of memory. First is a read only memory which has within it a set of factory installed processor instructions which are unalterable by the end user. These may be parts such as the 2708 made by Intel, Texas Instruments, Motorola, and others, or the 1702 made by Intel, National Semiconductor, Mostek, and others. The second is a random access memory which is alterable by the end user and which is used to temporarily store user defined data, such as time and station number. This may be any of a number of integrated circuit memory chips presently being manufactured, such as the 3101 type made under different parts numbers by Intel, Texas Instruments, and Intersil. The remaining elements of central control unit 12, are well known to those skilled in the art.

Memory 29 has stored within it certain factory set instructions and has memory space available for a set of user defined information. The factory set instructions tell processor 27 how to keep track of what time it is, how to sense the status of other parts of unit 12, how to communicate with these other parts, and how to react to the user defined information, which information includes a time, a station identifier, and an action, usually turn on, turn off or sense.

Normally, processor 27 acts as a timing device and includes, for this purpose, timing means (not shown). Processor 27 keeps track of time and periodically, such as once a minute, for example, transmits via control/data lines 28 an updated time to display 18, thereby apprising user 26 as to the current time. Additionally, processor 27 compares the current time with the times contained in the set of user defined information. If no match is found, processor 27 continues with its time keeping task. On the other hand, if a match is found, processor 27 causes memory 29 to transfer the appropriate station identifier and action information to digital modulator 30, via control/data lines 28, and simultaneously activates digital modulator 30. Digital modulator 30 is coupled directly to power distribution system 15 by means of power cord 17 and wall tap 16.

The modulation process itself may take any of a number of forms, but all will treat information as serial binary. For example, a binary "1" may be represented by a constant amplitude modulation of one frequency, say 50 kHz for 50 microseconds; this may be followed by a binary "0," 100 kHz for the same length of time or another binary "1." This method allows a simplicity of the modulation by using frequencies sufficiently higher than the basic power distribution frequency so as to not cause interference with other devices using power distribution system 15 but low enough so as to be easily compatible with presently existing technology. Other modulation techniques, such as frequency modulation, may be easily adopted to this use.

The command information transmitted by modulator 30 is either an on or off command or a "sense" command. If the information transmitted was an on or off command, then processor 27 is finished with this set of information. If the action was a sense command, then processor 27 will expect to receive information and, by means of control/data lines 28, commands digital demodulator 31 to monitor power distribution system 15 for a return digital modulation (explained more fully hereinafter) of the same frequency format as the modulation. Digital demodulator 31 then performs this monitoring function, converting the received modulation to binary ones and zeros, and transmits them via control/data lines 28 to processor 27 which interprets the information and acts according to the preset instructions. Responses to this sense information could be no action or transmission of either an on or an off command to the same or a different unit 13 or 14.

Processor 27 continues this process of comparing the current time with user defined times, taking appropriate actions as just described until all the user defined times have undergone this comparison. The process then returns to the time keeping and input sensing tasks.

User defined information may be entered into control unit 12 by means of a manual control panel 19 which may be of the form of a pocket calculator-type keyboard. User 26 would press the keys in a prescribed format, defining the time, station identifier, and desired action. Provisions would also be included to cause an immediate action instead of linking it to a time. Processor 27 senses the fact of the user input and the nature of the input via control/data lines 28 and transfers this input data to memory 29, also via control/data lines 28. During this transfer, processor 27 may also transfer the data to display 18 in order for user 26 to verify proper entry of the information. By appropriate manipulation of manual control panel 19, user 26 could also cause processor 27 to transfer to display 18 any previously entered information and also to clear or erase any previously entered information.

For information other than that entered via control panel 19, central control unit 12 is equipped with an antenna 20 coupled to a receiver 33 and demodulator/converter 32. This combination is tuned to a particular frequency, for example in the 88-108 MHz range, a range established by the Federal Communications Commission for use in low power communications devices. There is no specific requirement, other than FCC regulations, on the frequency used or the antenna/receiver selectivity, since transmissions from all devices are at the same frequency and the modulation scheme and the timing may be similar to that used in digital modulator 30. Receiver 33 picks up and amplifies the transmitted signal and feeds it to demodulator/converter 32 which demodulates the signal and converts it to a binary format identical to that of the information entered through control panel 19. Processor 27 senses, via control/data lines 28, the fact that demodulator/converter 32 has received information and transfers this information via control/data lines 28 to memory 29. Once entered into memory 29, the information is treated identically to that entered by means of control panel 19.

Figure 3:
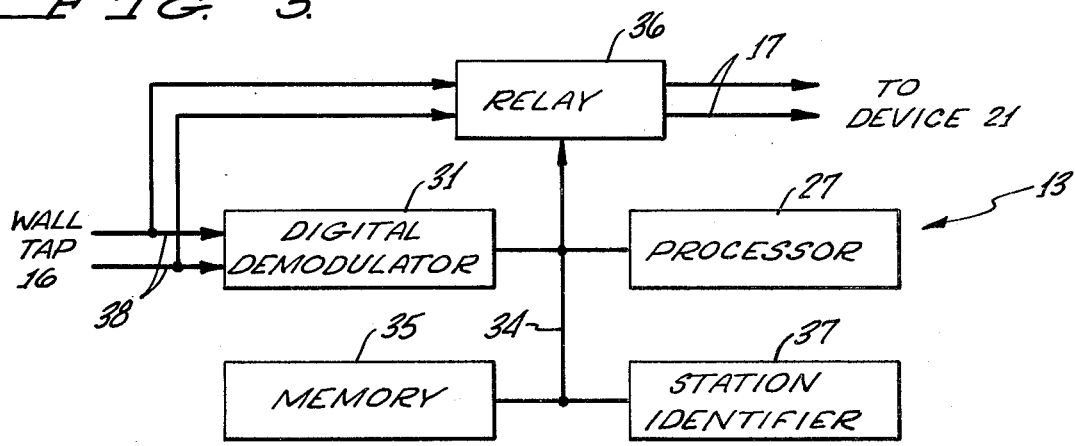
FIG. 3 is a block diagram of the receiver/demodulator unit of the system of FIG. 1.

Referring now to FIG. 3, remote receiver/demodulator unit 13 includes a processor 27 and digital demodulator 31 identical to those of central control unit 12, a memory 35 and control/data lines 34 which are identical in function to those of central control unit 12 but different in the exact details of implementation, a station identifier 37, a relay 36, and means 38 for connecting unit 13 to wall tap 16. Station identifier 37 is a means to uniquely identify each station and is functionally the same as a multi-position switch and may be implemented in that way or by a simpler means, such as user installed jumper wires. Each unit 13 in home 11 has a different setting, allowing each station to be uniquely identified by the user manually setting the switch.

Memory 35 contains only factory preset processor instructions and all such remote units 13 have the same set of instructions. Digital demodulator 31 acts in manner identical to that described previously and processor 27, acting in accordance with the factory set instructions contained in memory 35, senses, via control/data lines 34, received data demodulated by demodulator 31. Processor 27 compares the station identifier portion of the received information with the unique station identification set by the user. If there is no match, processor 27 takes no further action. If there is a match, processor 27 interprets the action portion of the information to either activate or de-activate relay 36, allowing power from wall tap 16 to be connected to or disconnected from power cord 17, one end of which is plugged into unit 13 and the other end of which is connected to any electrically operated device 21.

Figure 4:
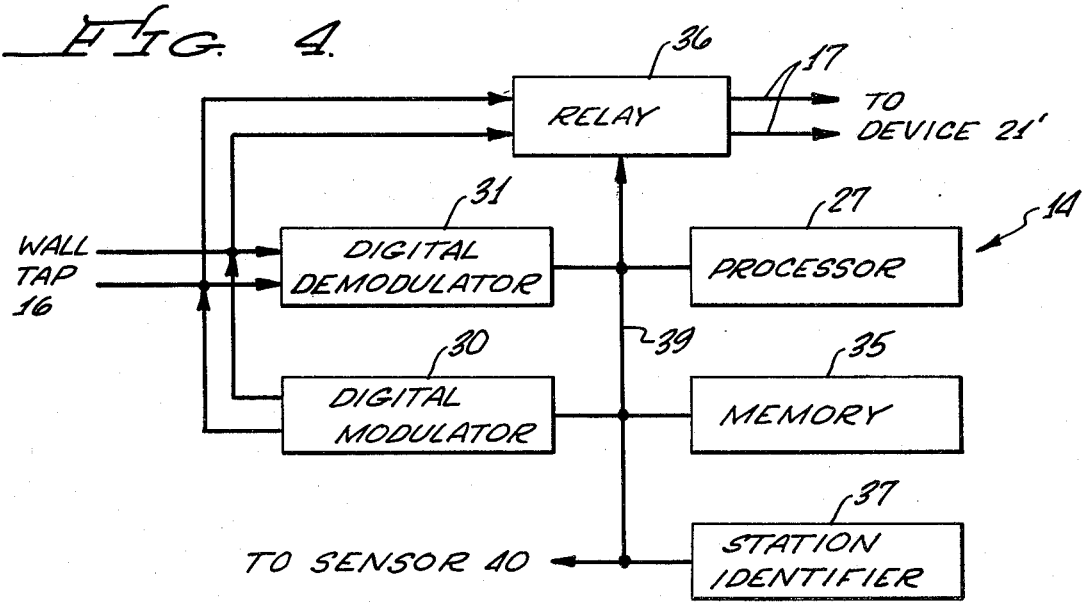
FIG. 4 is a block diagram of the receiver/demodulator/transmitter unit of the system of FIG. 1.

Referring now to FIG. 4, remote unit 14 may, for convenience, be thought of as being similar to remote unit 13 with the addition of a digital modulator 30 and provisions for connection to a sensor 40, interconnected to the remainder of the system by means of control/data lines 39, and additional factory set instructions in memory 35. The action of station identifier 37, digital demodulator 31, and relay 36, are identical to those of their counterparts in remote unit 13.

Sensor 40, typically a transducer of some sort, is any device used to monitor status and whose output is, or whose output may be converted to, a digital signal capable of being interfaced to control/data lines 39. It may take the form of an electronic thermometer with a self-contained analog-to-digital converter or a moisture sensor with a simple contact closure when moisture reaches a predetermined level.

Processor 27 and memory 35 acts similarly to the corresponding elements of remote unit 13, but there is now provision to receive and act upon a "sense" command contained in the action portion of received information. When this occurs, processor 27 samples the status of sensor 40, transfers this status via control/data lines 39 to digital modulator 30, and causes digital modulator 30 to start operation. The modulation process is identical to that of the corresponding modulator 30 in central control unit 12. Since this "sense" request is initiated by central control unit 12 and is directed to a particular remote unit 14, a response only from the particular remote unit 14 is expected and central control unit 12 refrains from sending any other control information until this response is received. Thus there is no danger of two units 14 or unit 12 and any unit 14 attempting to modulate power distribution system 15 at the same time.

Figure 5:
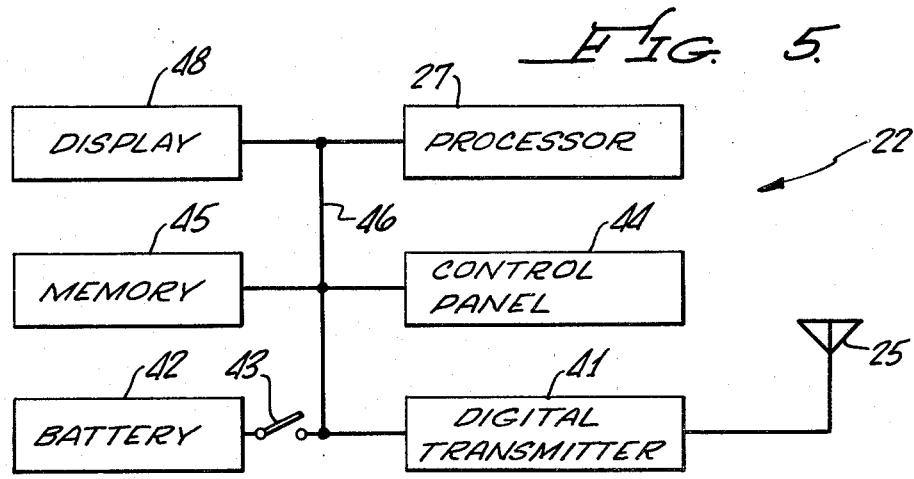
FIG. 5 is a block diagram of the portable control unit of the system of FIG. 1.

Referring now to FIG. 5, portable control unit 22 consists of a processor 27, a digital transmitter 41 having connected thereto an antenna 25, a battery 42, an on/off switch 43, manual control panel 44, a memory 45, control/data lines 46, and an optional display 48. The purpose of portable control unit 22 is to transmit information entered via control panel 44 by user 47 to central control unit 12, and not to act as a control unit itself. Therefore, memory 45 will consist almost entirely of factory set processor instructions and will have sufficient extra capacity to temporarily store user defined information as it is entered. Once entered and transmitted, this information will be erased from memory 45. Manual control panel 44 is very similar in appearance and function to manual control panel 19 of central control unit 12, but it cannot be used to recall any information previously entered or sense any status.

In operation, user 47 would turn switch 43 on and enter the desired time, station identifier, and the desired action via manual control panel 44. Provisions may also be included to cause an immediate action instead of linking it to a time. Processor 27 would sense this entry via control/data lines 46 and, acting in accordance with the preset instructions in memory 45, would transfer the information via control/data lines 46 to display 48 for user 47 to verify proper entry. Additionally, processor 27 would transfer the information and a "start transmitting" command to digital transmitter 41. Transmitter 41 transmits via antenna 25 at the frequency to which receiver 33 of central control unit 12 is tuned. The entered information is modulated onto this carrier frequency, using the same frequencies and formats as are used to modulate the power distribution system 15 by the digital modulators described previously. After entering and transmitting the desired information, user 47 would turn portable control unit 22 off by means of switch 43.

Referring now to FIG. 6, voice converter/transmitter unit 23 consists of a processor 27, a digital transmitter 41 and associated antenna 25, an audio amplifier 49, an analog-to-digital converter 50, a microphone 51, a memory 52, a control panel 53, control/data lines 54, and an optional display 55. Unit 23 functions to convert verbal commands to digital patterns of the same format as recognized by central control unit 12 and to transmit this format to unit 12. To this end, processor 27, memory 52, control panel 53, display panel 55, digital transmitter 41, and antenna 25 act in the same manner as the corresponding elements in portable control unit 22. In fact, as an option, this unit may be packaged as a portable, battery operated unit. Control panel 53, in addition to the functions of previously described control panels, has a mode control switch 56, which allows unit 23 to be operated in either a calibrate mode or a normal mode.

When unit 23 is in the calibrate mode, user 26 speaks a word into microphone 51. Audio-amplifier 49 amplifies the signal from microphone 51 to levels consistent with the input level requirements of analog-to-digital converter 50. Converter 50 samples the audio signal at a rate which would enable accurate reproduction of the signal if the process were reversed. Presently, there are such units available operating at rates in excess of 16,000 samples per second. At the end of the conversion of each word, analog-to-digital converter 50 signals, via control/data lines 54, the end of a conversion. Processor 27, acting according to preset instructions stored in memory 52, stores the binary results of the conversion in the portion of memory 52 reserved for user defined words. Concurrent with this action, user 26 manipulates control panel 53 to indicate the meaning of the words spoken, i.e. whether it is a time, a station identifier, or a command. Processor 27 senses this entry via control/data lines 54 and, acting according to preset instructions, transfers this entry to memory 52 in such a manner that the entry will be considered as "paired" with the spoken entry. Provision is also made to accomodate a code or key word which must be spoken first to allow the process to begin, thereby eliminating accidental action during normal conversation. No restrictions other than reasonable brevity, e.g. words of one or two syllables, need be placed on the words spoken.

User 26 continues in this manner until all verbal information which the user feels might be converted and transmitted to central control unit 12 has been entered in this manner. Switch 56 is then set to the normal mode. In the normal mode, microphone 51, audio amplifier 49 and analog to digital converter 50 are continuously operating in the manner described, with all sounds reaching microphone 51 undergoing the conversion process. As each conversion is completed, processor 27, instead of storing the binary results, as done during the calibrate mode, now compares the results with all the stored user spoken information. If no match is found, no action is taken. If a match is found, processor 27 locates in memory 52 the control panel entry previously paired with that sound and temporarily duplicates that entry in a portion of memory 52 reserved for user defined actions.

Processor 27, acting in accordance with preset instructions, monitors this process and determines when all information necessary to completely specify an action has been received. When this occurs, processor 27 transfers the information via control/data lines 54 to digital transmitter 41 which acts in the manner described previously.

Various safeguards can be built into the processor executed instructions to minimize or eliminate accidental actions. For example, in addition to the key word mentioned previously, it is possible to impose various requirements on the order in which the words are spoken and on the allowed time interval between the words, eliminating the possibility of acting on words which are spoken minutes or even hours apart.

Referring now to FIG. 7, accoustic telephone converter/transmitter 24 contains all of the elements found in voice converter/transmitter 23. In addition, unit 24 includes a speaker 58 and an accoustic telephone coupler/amplifier 59 whose function is similar to that of presently available devices.

Operation is as described previously for unit 23 with the exception that processor 27, acting in accordance with factory preset instructions contained in a memory 60, monitors the status of unit 24 and controls coupler/amplifier 59 via control/data lines 61. When a telephone 62 rings, it is "answered" by accoustic telephone coupler/amplifier 59 which amplifies the received voice signal and feeds it to speaker 58 which is positioned close enough to microphone 51 for microphone 51 to pick up the amplified voice signal. The remaining process is now identical to the normal mode of operation of unit 23.

In operation, a user will typically buy a central control unit 12, a number of remote units 13 and/or 14, and, as deemed necessary, one or more of units 22, 23, and/or 24. The user will then install these items at places in his or her house deemed most convenient. When installing remote units 13 and/or 14, the user would set each of the station identifiers 37 so that there is no duplication of settings.

After installing central control unit 12, the user first sets the desired times by pushing the appropriate buttons on control panel 19. This time appears on display 18 and is automatically updated by processor 27 at preset intervals. After setting the time, the user then "programs" central control unit 12 by again pressing the appropriate buttons on control panel 19 to enter a time, a station number, and an action. For example, the user might enter "10:00 PM, station 2, and on" meaning that at 10:00 at night, central control unit 12 will send out a signal which tells the remote unit, called station 2, to activate, allowing power from the associated wall taps 16 to pass to the device 21 plugged into station 2.

Alternatively, the user might enter "7:00 AM, station 4, sense, good, on." This would mean that at 7:00 in the morning, central control unit 12 sends out a signal to station 4 asking it to send back a status signal. Station 4 would have a unit 14 and upon receiving the signal would interrogate the status of the sensor 40 attached to it and would transmit this status back to central control unit 12. Central control unit 12 receives the status and if it is "good," transmits a second signal to station 4 telling it to activate remote device 21'. This method could be used in those areas where there are water shortages, placing a moisture sensor in a yard, so that the yard will not be unnecessarily watered.

The user continues to enter settings in this manner until either all the remote units have been programmed or all the available user random access memory has been utilized. In the event that all the remote units have been programmed and there is still room in the user memory, the remote units can be programmed again, allowing multiple turn-ons and turn-offs during the day.

It can therefore be seen that according to the present invention, there is provided a central control system 10 which solves the problems encountered heretofore. With system 10, each electrical device 21 or 21' to be activated is plugged into a remote actuator 13 or 14, respectively, with no less convenience or ease than plugging into a conventional wall tap 16. Central control unit 12 is just as easy to install and may be placed anywhere. Additionally, receiver 33 of central control unit 12 may have sufficient sensitivity and the transmitters in portable control unit 22, voice converter/transmitter unit 23, and accoustic telephone converter/transmitter unit 24, may have sufficient power so that they may be used at any convenient place within home 11 without inhibiting proper operation of central control unit 12.

After transmission by central control unit 12, the information is simultaneously available at all wall taps 16 within home 11. With such an arrangement, one can go to any wall tap 16 and plug in a remote unit 13 or 14 to receive and demodulate the information. Furthermore, multiple units can be provided in different locations in home 11.

With system 10, a user can effectively control electrically operated devices scattered within home 11 from a single point. This being the case, it is unnecessary to go to each location for the purpose of activating, deactivating, or otherwise controlling an electrically operated device. System 10 can be installed in a conventional home without any rewiring or modification thereof other than the installation of the various units and the connection thereof to the conventional power distribution wall taps 16.

While the invention has been described with respect to a preferred physical embodiment constructed in accordance therewith, it will be apparent to those skilled in the art that various modifications and improvements may be made without departing from the scope and spirit of the invention. For example, while a specific frequency range and frequencies have been given for the various units within system 10, it will be evident to those skilled in the art that such ranges and frequencies have been for example only and that a wide variety of frequencies and ranges may be used depending on the circumstances and local transmitting regulations. Additionally, while system 10 has been described as plugging into wall tap 16, it will be evident to those skilled in the art that some of the units may be wired directly into house 11 thereby replacing the receptacle contained within wall tap 16. Furthermore, while system 10 has been described as being applicable in a home with a common power distribution system 15, it will be evident to those skilled in the art that the present system may be used in places other than a home and may be easily adapted to facilities not having a common power distribution system. Additionally, while system 10 has been described as being applicable for the monitoring of status information and the transmission of control information, it will be evident to those skilled in the art that system 10 may be used to monitor and transmit other types of information. Accordingly, it is to be understood that the invention is not to be limited by the specific illustrative embodiment, but only by the scope of the appended claims.

I claim:

1. A system for use in a facility equipped with a common electrical system for controlling, from a central location, the operation of one or more remote devices, comprising:
   a central control unit located within said facility and including:
      means for maintaining current time-of-day information and for generating a signal indicative of the time-of-day;
      memory means for storing user-entered command information and time-of-day information associated therewith;
      processor means for comprising said time-of-day signal with said time-of-day information stored in said memory means for transferring said command information associated with said time-of-day information from said memory means in the presence of a time match; and
      a modulator responsive to said stored command information transferred from said memory means for modulating command signals onto a carrier signal and for coupling said carrier signal directly to said electrical system; and
   a receiver/demodulator unit coupled to said electrical system and to a remote device for receiving and demodulating command signals from said central control unit and for controlling the operation of said remote device.

2. A system according to claim 1, wherein said command signals are in serial binary format.

3. A system according to claim 2, wherein said memory means further stores user-entered remote device selection information, wherein said processor means is operative to transfer to said modulator said remote device selection information associated with said command information from said memory means in the presence of a time match, wherein said modulator modulates said remote device selection information and said stored command information serially onto said carrier signal, and wherein said receiver/demodulator unit further comprises: station identifier means responsive to said remote device selection information in serial binary format for determining whether the command information associated therewith is intended for the remote device with which said receiver/demodulator unit is associated or whether such command information is intended for another remote device.

4. A system according to claim 1, wherein said central control unit comprises:
   a control panel for manually entering command information from a user of said system.

5. A system according to claim 1, wherein said receiver/demodulator unit comprises:
   a demodulator coupled to said common electrical system for receiving and demodulating command signals from said central control unit;
   a memory containing preset instructions;
   a processor for acting, in accordance with the instructions contained in said memory, on said received and demodulated command signals and for generating an operation signal; and a relay coupled to said remote device and responsive to said operation signal from said processor for activating and/or deactivating said remote device.

6. A system according to claim 5, wherein said receiver/demodulator unit further comprises:
station identifier means responsive to said demodulator for determining whether the received and demodulated command signals are intended for the station in which said receiver/demodulator unit is located or whether such signals are intended for another station.

7. A system according to claim 6, wherein said command signals are in a serial binary format.

8. A system according to claim 7, wherein said memory means further stores user-entered station selection information, wherein said processor means is operative to transfer to said modulator said station selection information associated with said command information from said memory means in the presence of a time match, wherein said modulator modulates said station selection information and said stored command information serially onto said carrier signal, and wherein said station identifier means is responsive to said station selection information in serial binary format.

9. A system according to claim 1, wherein said central control unit further comprises:
a receiver for receiving transmitted command information; and further comprising:
portable means including a transmitter and a manual control panel for transmitting information entered via said control panel by a user of said system to said central control unit to permit operation of said central control unit from a remote location.

* * * * *

UNITED STATES PATENT OFFICE
CERTIFICATE OF CORRECTION

PATENT NO. : 4,174,517
DATED : November 13, 1979
INVENTOR(S) : JEROME MANDEL

It is certified that error appears in the above-identified patent and that said Letters Patent are hereby corrected as shown below:

In column 12, line 20, the word "comprising" should read --comparing--.

Signed and Sealed this

Eighth Day of April 1980

[SEAL]

Attest:

SIDNEY A. DIAMOND

Attesting Officer     Commissioner of Patents and Trademarks